(12) United States Patent
Magin

(10) Patent No.: US 7,314,102 B2
(45) Date of Patent: Jan. 1, 2008

(54) PERCUSSION OR HAMMER DRILL

(75) Inventor: Michael Magin, Trier (DE)

(73) Assignee: Ceratizit S.A., Luxembourg (LU)

( * ) Notice: Subject to any disclaimer, the term of this patent is extended or adjusted under 35 U.S.C. 154(b) by 281 days.

(21) Appl. No.: 10/498,408

(22) PCT Filed: Dec. 16, 2002

(86) PCT No.: PCT/EP02/14329

§ 371 (c)(1),
(2), (4) Date: Dec. 23, 2004

(87) PCT Pub. No.: WO03/051565

PCT Pub. Date: Jun. 26, 2003

(65) Prior Publication Data
US 2005/0103532 A1    May 19, 2005

(30) Foreign Application Priority Data
Dec. 17, 2001   (LU) .................................... 90862

(51) Int. Cl.
E21B 10/36 (2006.01)

(52) U.S. Cl. ..................... 175/415; 408/230

(58) Field of Classification Search .......... None
See application file for complete search history.

(56) References Cited

U.S. PATENT DOCUMENTS 5,482,124 A * 1/1996 Haussmann et al. ........ 175/415
5,779,403 A * 7/1998 Kleine et al. ............... 408/230
5,836,410 A * 11/1998 Kleine ........................ 175/415
5,957,631 A   9/1999 Hecht
6,550,555 B2 * 4/2003 Huber et al. ................ 175/415
2001/0013431 A1  8/2001 Huber et al.

FOREIGN PATENT DOCUMENTS

EP    1 034 864     9/2000
WO    WO 00/25967   5/2000

OTHER PUBLICATIONS

International Search Report; PCT/EP02/14329; Mar. 17, 2003.

* cited by examiner

Primary Examiner—Frank Tsay
(74) Attorney, Agent, or Firm—Cantor Colburn LLP

(57) ABSTRACT

A percussion or hammer drill is provided including a drill plate arranged in the head end of a drill shaft, extending completely across the diameter of the drill shaft and comprising an open front face. Wedge-shaped cutting edges and flanks form two main cutters on the front face, whereby a plane running through the drill axis forms a mid-plane-of both main cutters. The main cutters form a tip angle in the range of approximately 140° to 180° and are separated by a central point.

27 Claims, 5 Drawing Sheets

PERCUSSION OR HAMMER DRILL

BACKGROUND OF THE INVENTION

This invention concerns a percussion drill or hammer drill.

During drilling, a percussion or hammer drill, also known as a masonry, concrete or stone drill, performs a percussive movement along the drilling axis and a rotary movement about the drilling axis. Both components of its movement contribute to the removal of material in the drill hole. The axial movement shatters the material in the drill hole. The rotary movement, by abrasion, causes a reduction of the material into drilling dust and carries the drilling dust away out of the drill hole.

Known percussion or hammer drills consist of a drill shaft with a hardened metal plate, the cutting plate, set in it. Spiral grooves run along the shaft to evacuate the drilling dust from the drill hole. The cutting plate extends across the diameter of the drill shaft. At its exposed front surface, chip surfaces and free surfaces arranged in a wedge shape form cutting edges. These consist of two linear main edges offset parallel to a plane in which the drilling axis lies, and a transverse edge linking the two main edges through the drilling axis. In order to achieve satisfactory centering when starting to drill, there is an angle not exceeding 130° between the two main cutting edges.

BRIEF SUMMARY OF THE INVENTION

A task of this invention was to optimize removal of material in the drill hole by suitable design of the cutting plate. This task is fulfilled by a percussion or hammer drill in accordance with claim 1 or 15.

Such a percussion or hammer drill, also designated by the generic term "masonry drill", consists of the standard layout of a drill shaft with a cutting plate set in its head end. This cutting plate extends right across the diameter of the drill shaft and displays an exposed front surface. In this front surface—in a first embodiment—chip surfaces and free surfaces arranged in a wedge shape form linear main cutting edges diametrically opposite to each other. In this arrangement, a plane running through the drilling axis forms a central plane of both main cutting edges. With this arrangement of the main cutting edges, the percussive energy is transmitted into the material more advantageously than with two main cutting edges offset parallel to a plane in which the drilling axis lies. Thus the percussive energy is applied more effectively for demolishing material in the drill hole.

Further optimization of material removal in the drill hole is achieved by the fact that the two main cutting edges meet at an apex angle that is greater than 130° and lies preferably in the region of 150° to 170°, for example 155° to 165°. The increase in apex angle similarly yields more effective application of the percussive energy for removal of material in the drill hole.

In order to achieve satisfactory centering when starting to drill with a wide apex angle, it is advantageous if a centering point is provided between the two diametrically opposite main cutting edges. The apex angle of this central point is then smaller than the apex angle between the two main cutting edges. It may lie, for example, in the range of 80° to 130°.

Between the centering point and the chip surfaces or the free surfaces, as the case may be, it is advantageous to provide rounded transition zones, in order to prevent stress concentrations between the centering point and the main cutting edges.

The centering point may be formed in plane symmetry with two planes perpendicular to each other, both of which pass through the drilling axis and one of which also constitutes the central plane of the two main cutting edges. Such plane symmetry makes it possible to design a centering point that contributes to high material removal performance, high stability and outstanding resistance to wear of the cutting plate. As an alternative, the centering point can be designed with rotational symmetry.

According to another embodiment of the invention, removal of material from the drill hole is optimized through corresponding shaping of the cutting plate. If the apex angle between the main cutting edges increase radially from the inside towards the outside, the main cutting edges are better matched to the prevailing loads and removal of material is optimized. The apex angle is then increased steadily in an outward direction along a main cutting edge by 20° to 40°. In this arrangement, the smallest apex angle then advantageously lies in the range between 70° and 90°, and the greatest apex angle lies advantageously in the range between 90° and 130°.

In this connection it should be mentioned that in this embodiment, the two main cutting edges may, but need not, lie diametrically opposite to each other.

Furthermore, the wear resistance of the cutting plate can be improved if the angle between the angle bisector of the cutting wedge and the mid-plane of the two main cutting edges increases in an outward direction along the main cutting edges. In this respect, it has been shown to be advantageous if this angle is increased from about 5° to 25°.

The stability of the cutting plate is further enhanced by a cutting wedge that is rounded off at the tip, the radius of this rounding being greater in the outer zone than in the inner zone.

In addition, it has proved advantageous, with the tip angles of 150° to 170° used here, to increase the stability of the cutting edge by a protective chamfer of the outer edge.

BRIEF DESCRIPTION OF THE DRAWINGS

In what follows, an example of an embodiment of the invention will be described with reference to the attached figures. These show the following.

DETAILED DESCRIPTION OF THE INVENTION

Figure 1:
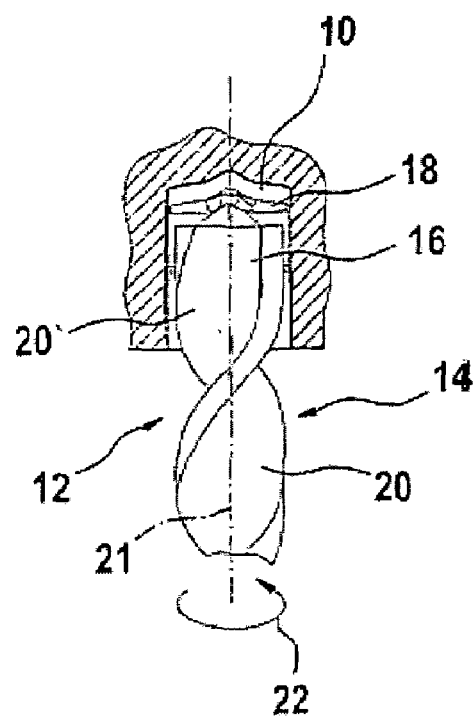
FIG. 1 A section of a percussion drill according to the invention in a drill hole.

The percussion or hammer drill 12 shown in FIG. 1 in a drill hole 10 consists of a drill shaft 14 in the head end 16 of which is set a hard metal plate 18, the drill plate or cutting plate as it is also known. This extends right across the diameter of the head end 16. Spiral grooves 20, 20' run along the drill shaft 14 to carry away the drilling dust out of the drill hole 10. The drilling axis is designated by the reference number 21. The percussion drill 12 performs a percussive movement along the direction of the drilling axis 21 and a rotary movement (see arrow 22) about the drilling axis 21. Both of these components of its motion contribute to the destruction of material in the drill hole 10. The axial movement shatters the material in the drill hole 10. The rotary movement causes reduction of the material into drilling dust by abrasion and carries away the drilling dust out of the drill hole 10.

A first embodiment of a cutting plate 18 for a percussion or hammer drill 12 according to the invention will be described with reference to FIGS. 2 to 6. Such a cutting plate 18 comprises a fixing shaft 24, to all intents and purposes prismatic in shape, which is welded into a corresponding slit in the head end 16 of the drill shaft 14 (see also FIG. 3, in which the outlines of the head end 16 are indicated by a broken line). The fixing shaft 24 is provided with narrow sides 26 and 26', each formed of a cylindrical face 28, 28' and a flat face 30, 30'. The cylindrical face 28, 28' in each case precedes the flat face 30, 30' in its direction of rotation and ensures that the drill 12 follows the drill hole 10. The flat face 30, 30' is set slightly back with respect to the diameter of the drill hole 10, thus reducing the friction of the narrow sides 26 and 26' in the drill hole.

The end of the cutting plate 18, which protrudes axially from the head end 16 of the drill shaft 14, displays a profiled front face 32, the profile of which is described in greater detail below. In this exposed front face 32, the chip surfaces 34, 34' in combination with the free surfaces 36, 36' respectively are arranged together in a wedge shape so as to form the main cutting edges 38, 38'. As can be seen most clearly in FIG. 3, the cutting plate 18 is provided with two linear main cutting edges 38, 38', arranged diametrically opposite to each other so that the plane 40 through the drilling axis 21 constitutes a central plane of the two main cutting edges 38, 38'. In the cutting plate 18 shown, this central plane 40 forms an angle 44 of approximately 8° with the central plane 42 of the fixing shaft 24. In this arrangement, the central plane 42 intersects each of the two narrow sides 26, 26' just behind the transition point between the flat faces 30, 30' and the cylindrical faces 28, 28'.

Figure 2:
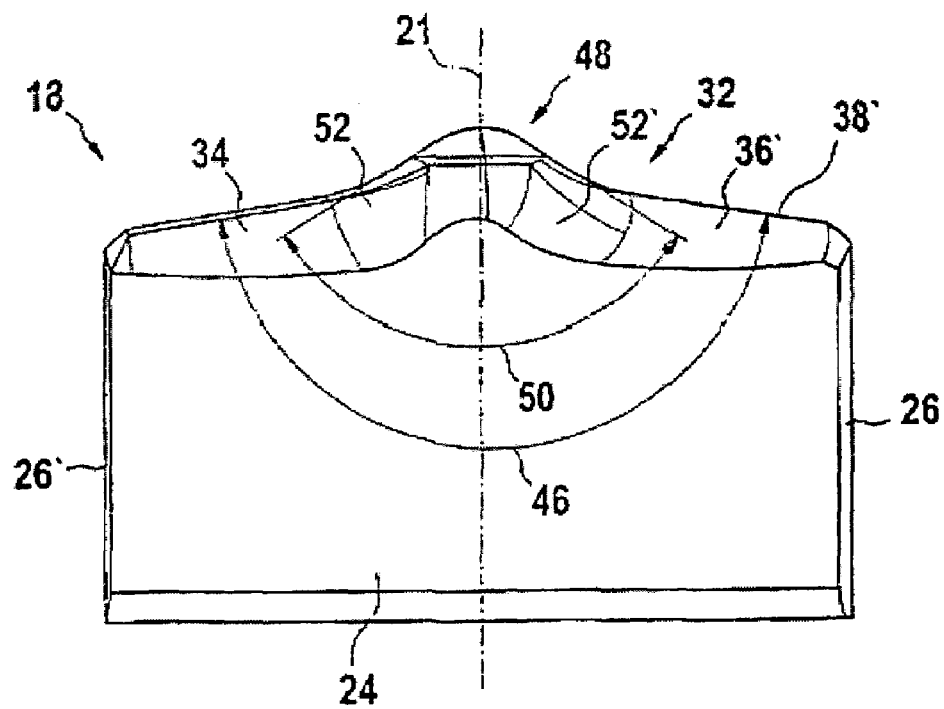
FIG. 2 An elevation of a cutting plate.

FIG. 2 shows how the two main cutting edges 38, 38' slope down from the inside towards the outside. In the central plane 40, they form what may be termed an apex angle 46, of 162°, for example, in the cutting plate 18 shown (in previous hammer drills this apex angle was no greater than 130°). The effect of the very blunt apex angle 46, together with the common central plane 40 of the two main cutting edges 38, 38', is that the percussive energy during drilling is strongly concentrated in the material being drilled, while friction is low. These two features thus contribute to a significant optimization of shattering of the material in the drill hole 10.

Figure 3:
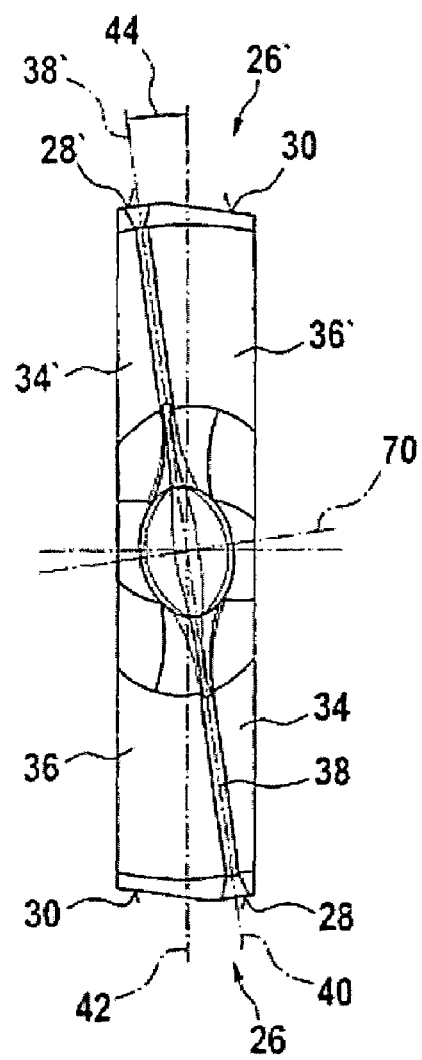
FIG. 3 A top view of the front surface of the cutting plate shown in FIG. 2.
Figure 4:
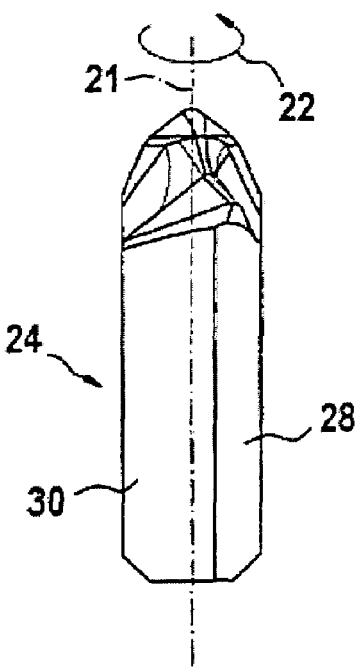
FIG. 4 A side view of the cutting plate shown in FIG. 2.
Figure 5:
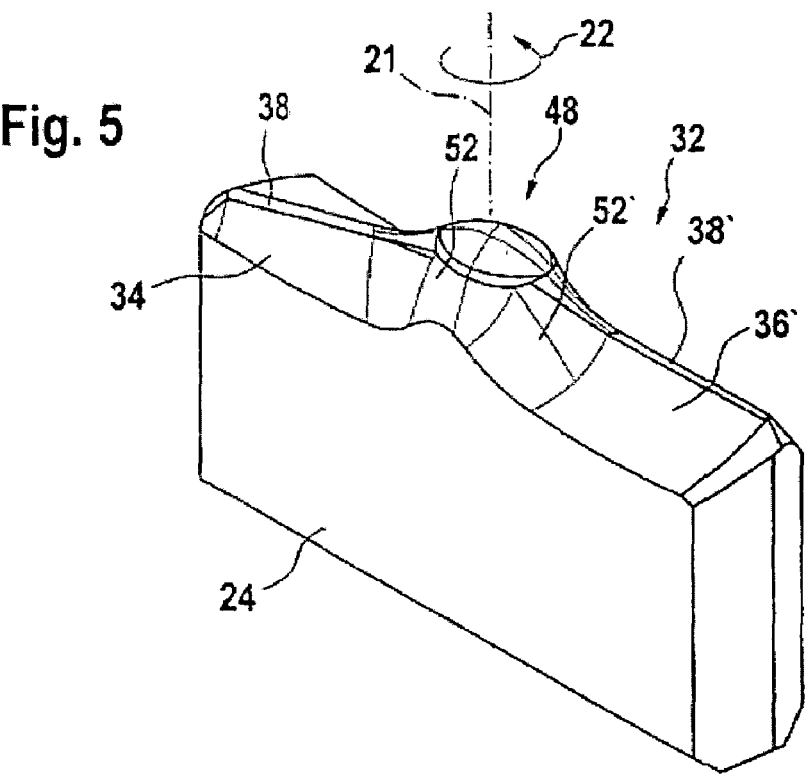
FIG. 5 A perspective view of the cutting plate shown in FIG. 2.

As can best be seen in FIGS. 2 and 5, the two main cutting edges 38, 38' are separated by a centering point 48 which is centered on the drilling axis 21. This centering point 48 is in plane symmetry with respect to the two planes 40, 70, which are perpendicular to each other. The first plane 40 is the central plane described in greater detail above. The second plane 70 also includes the drilling axis 21 and is perpendicular to the central plane 40. As can be seen in FIG. 3, the centering point 48 is oval in cross-section, the longer axis of the oval lying in the central plane 40 and the shorter axis in the plane 70. As can be seen in FIG. 5, the centering point 48 displays more or less the shape of a cutter such as is commonly used in mining. However, it is significantly more blunt in shape in the direction of the central plane 40. It should also be noted that the centering point 48 contributes to higher boring performance, greater stability and outstanding resistance to wear of the cutting plate 18. The rounded transition surfaces 52, 52' are designed to prevent phenomena of stress concentration between the centering point 48 and the main cutting edges 38, 38', which could generate stress peaks leading to fracture during drilling. Another point to note is that the transition surfaces 52, 52' in the transition zones between the centering point and the chip surfaces can have a different radius of curvature from those between the centering point and the free surfaces.

Figure 6:
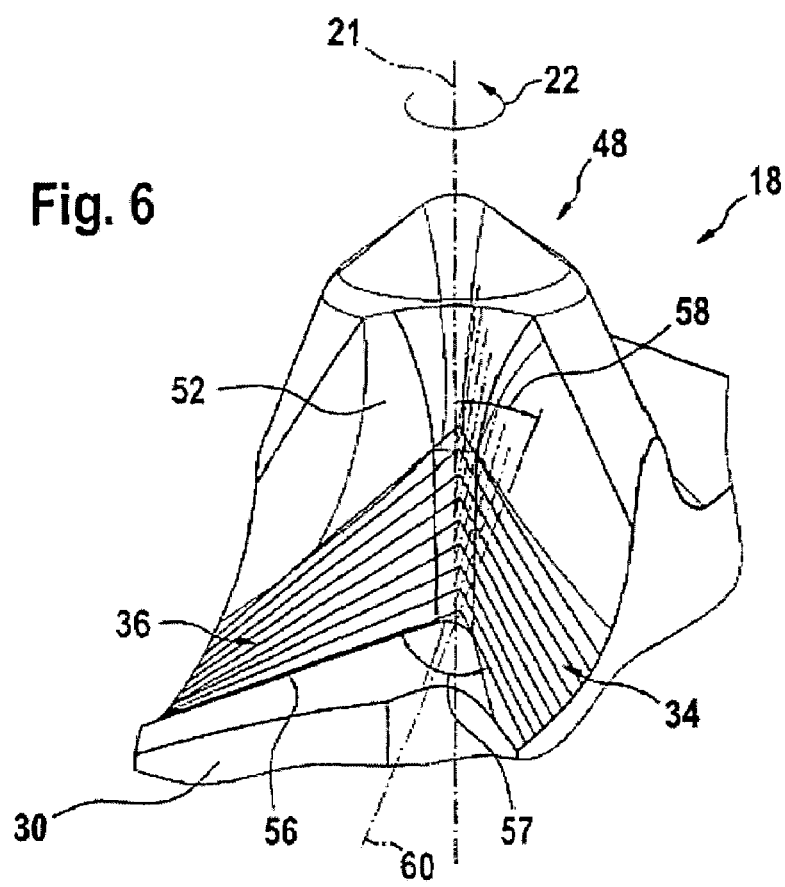
FIG. 6 An enlarged section of a perspective view of the cutting plate shown in FIG. 2.
Figure 7:
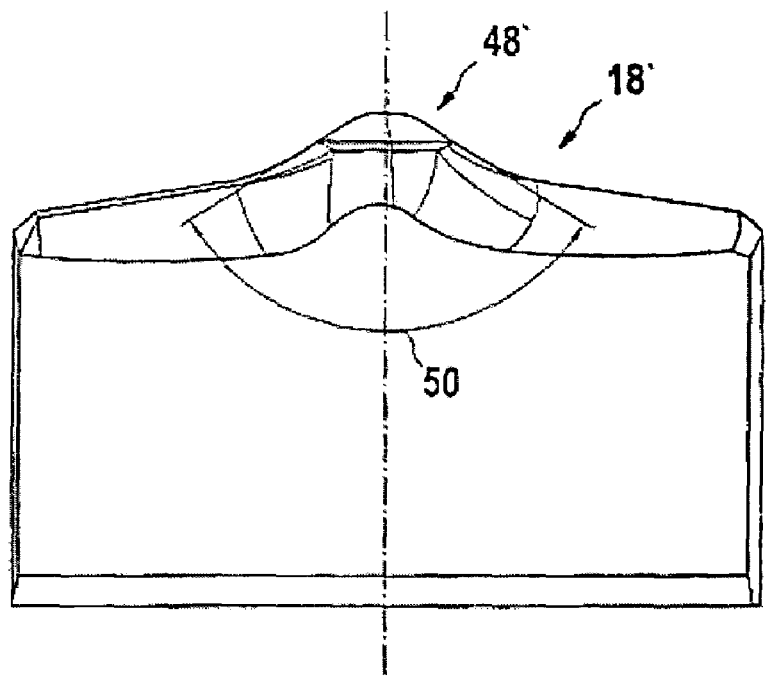
FIG. 7 An elevation of a structural variant of the cutting plate shown in FIG. 1.
Figure 8:
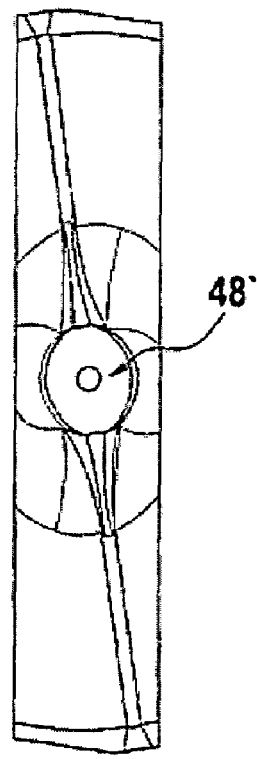
FIG. 8 A top view of the front surface of the cutting plate shown in FIG. 7.
Figure 9:
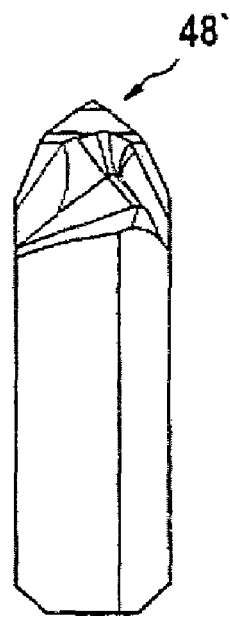
FIG. 9 A side view of the front surface of the cutting plate shown in FIG. 7.
Figure 10:
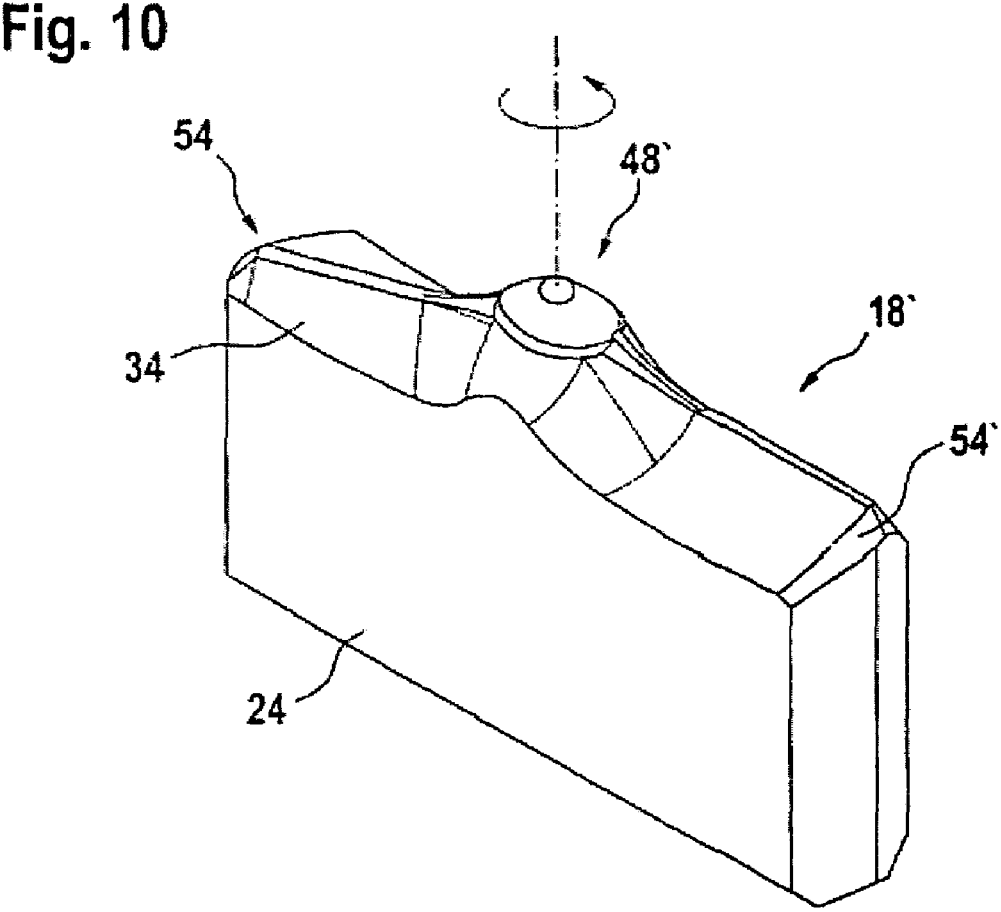
FIG. 10 A perspective view of the cutting plate shown in FIG. 7.

The cutting wedge constituted by the chip surface 34 and the free surface 36 will now be described in greater detail with reference to FIG. 6. This cutting wedge will be defined, for each point on a main cutting edge 38, 38', by a tangent 54 to the free surface 36 and a tangent 56 to the free surface 36, in a sectional plane which is perpendicular to the central plane 40 and parallel to the axis of rotation 21. As the projections of the chip surfaces 34, 34' and the free surfaces 36, 36' in the cutting plate 18 of FIG. 6 in the sectional plane are largely flat, the tangents 54, 56 effectively constitute the lines of intersection between the chip surface 34, 34', resp. free surface 36, 36' and the sectional plane.

It should be noted that the point of the cutting wedge is rounded, or to put it another way, each of the main cutting edges 38, 38' is rounded off. A large edge radius here favors the stability of the cutting plate. A smaller edge radius, on the other hand, favors drilling performance. In the cutting plate 18, the edge radius of the main cutting edges 38, 38', as can best be seen in FIG. 3, is fairly constant in the inner zone, but becomes significantly greater in proximity to the narrow sides 26, 26'. By this means, the main cutting edges 38, 38' are strengthened in a particularly critical outer zone, but in the inner zone display a relatively small edge radius, which favors drilling performance.

Returning to FIG. 6, it may also be noted that the angle of the cutting wedge (referred to from now on as the wedge angle 57) along the main cutting edges 38, 38' is not constant, but increases from the inside to the outside. In the cutting plate 18 in FIG. 6, for example, the wedge angle 57 shows a linear increase with the radius, from about 80° at the two transition surfaces 52, 52' to about 110° at the two narrow sides 26, 26'. It can also be observed that the orientation of the cutting wedge along the main cutting edges 38, 38' is not constant either. This orientation is measured as the angle 58 between the angle bisector 60 of the cutting wedge and the central plane 40. In the cutting plate 18 in FIG. 6, this angle 58 increases with the radius, from about 5° at the two transition surfaces 52, 52' to about 25° at the two narrow sides 26, 26'. Both the radially varying orientation of the cutting wedge and the radially varying wedge angle 57 of the cutting wedge give improved stability to the cutting plate 18. This therefore becomes significantly stronger in its radially outer zone, that is to say where its tangential velocity is highest, and nevertheless displays outstanding drilling performance. It should also be noted that a larger wedge angle 57 in the outer zone results in a larger amount of material, reducing wear on the corners of the cutting plate, something that has to be kept in view during percussion or hammer drilling. Such wear on the corners leads, among other effects, to a reduction in the diameter of the drill hole 10, so that slowing down wear on the corners extends the life of the drill 12.

In addition, with the very blunt apex angle 46 used here, it has proved advantageous to provide the outer edge of cutting edge, chip face and free face with a protective chamfer 54, 54' as a means of further increasing the stability of the cutting plate. The shape illustrated for the protective chamfer 54, 54' is only one of a variety of possible embodiments.

The cutting plate 18 in FIGS. 7 to 10 differs from the cutting plate 18 shown in FIGS. 2 to 6 primarily in the design of the centering point 48. This no longer displays plane symmetry with two planes perpendicular to each other, but displays rotational symmetry instead. In this arrangement, the centering point 48 is given an apex angle 50 which is significantly smaller than the apex angle 46 between the two main cutting edges 38, 38', in order to enable satisfactory centering of the drill when starting a hole. In the cutting plate 18 illustrated, the apex angle 50 shown as an example for the centering point 48 is 90°, that is to say 72° less than the apex angle 46 of the two main cutting edges 38, 38'. The centering point 48 of the cutting plate 18 is made to all intents and purposes rotationally symmetrical, with transition surfaces 52, 52' enabling a rounded transition towards the chip surfaces 34, 34' and the free surfaces 36, 36'.

| Key to references | |
|---|---|
| 10 | Drill hole |
| 12 | Percussion or hammer drill |
| 14 | Drill shaft |
| 16 | Head end |
| 18 | Hard metal plate |
| 20, 20' | Spiral grooves |
| 21 | Drilling axis |
| 22 | Direction of rotation |
| 24 | Fixing shaft |
| 26, 26' | Two narrow sides |
| 28, 28' | Cylindrical face |
| 30, 30' | Flat face |
| 32 | Front face |
| 34, 34' | Chip surface |
| 36, 36' | Free surface |
| 38, 38' | Main cutting edges |
| 40 | Central plane |
| 42 | Central plane |
| 44 | Angle |
| 46 | Apex angle |
| 48 | Centring point |
| 50 | Apex angle |
| 52, 52' | Transition surfaces |
| 54, 54' | Protective chamfer |
| 57 | Wedge angle |
| 58 | Angle |
| 60 | Angle bisector |

The invention claimed is:

1. Percussion or hammer drill comprising:
a drill shaft with a head end;
a cutting plate set in the head end and extending over a diameter of the drill shaft and provided with an exposed front face; and
chip and free surfaces arranged in a wedge shape in the front face forming two main cutting edges positioned diametrically opposite to each other;
wherein, both main cutting edges lie in a central plane passing through a drilling axis.

2. Drill according to claim 1, further comprising an apex angle between the two main cutting edges in the range of approximately 140° to 180°.

3. Drill according to claim 1, further comprising an apex angle between the two main cutting edges in the range of approximately 150° to 170°.

4. Drill according to claim 1, further comprising an apex angle between the two main cutting edges in the range of approximately 155° to 165°.

5. Drill according to claim 1, further comprising a centering point shaped between the two diametrically opposed main cutting edges, wherein an apex angle of the centering point is smaller than an apex angle between the two main cutting edges.

6. Drill according to claim 5, further comprising rounded transition surfaces provided between the centering point and the chip surfaces and between the centering point and the free surfaces.

7. Drill according to claim 5, wherein the centering point is made rotationally symmetrical in shape.

8. Drill according to claim 5, wherein the centering point is shaped in plane symmetry with respect to two planes perpendicular to each other, wherein both planes run through the drilling axis and one of the two further constitutes the central plane of the two main cutting edges.

9. Drill according to claim 5, further comprising an apex angle of the centering point in the range of approximately 80° to 130°.

10. Drill according to claim 1, further comprising a wedge angle between the main cutting edges which increases radially in an outward direction.

11. Drill according to claim 10, wherein the wedge angle increases by 20° to 40°.

12. Drill according to claim 11, wherein the smallest wedge angle between the main cutting edges is in the range of approximately 70° to 90°.

13. Drill according to claim 1, wherein an angle between an angle bisector of the cutting wedge and the central plane of both main cutting edges increases in an outward direction along the main cutting edges.

14. Drill according to claim 1, further comprising a rounded main cutting wedge of greater radius in its outer part than in its inner part.

15. Percussion or hammer drill comprising:
a drill shaft with a head end;
a cutting plate set in the head end which extends over a diameter of the drill shaft and is provided with an exposed front face;
chip and free surfaces arranged in a wedge shape in the front face forming two main cutting edges, and
a wedge angle in the main cutting edges which increases radially in an outward direction;
wherein an angle between an angle bisector of the cutting wedge and the central plane of the two main cutting edges increases in an outward direction along the main cutting edges.

16. Drill according to claim 15, wherein the wedge angle increases by approximately 20° to 40°.

17. Drill according to claim 15, wherein the smallest wedge angle between the main cutting edges is in the range between approximately 70° and 90°.

18. Drill according to claim 15, further comprising a rounded main cutting wedge with radius greater in its outer part than in its inner part.

19. Drill according to claim 15, wherein a plane running through a drilling axis constitutes the central plane of the two main cutting edges.

20. Drill according to claim 15, further comprising an apex angle between the two main cutting edges in the range of approximately 140° to 180°.

21. Drill according to claim 15, further comprising an apex angle between the two main cutting edges in the range of approximately 150° to 170°.

22. Drill according to claim 15, further comprising an apex angle between the two main cutting edges in the range of approximately 155° to 165°.

23. Drill according to claim 15, further comprising a centering point provided between the two main cutting edges positioned diametrically opposite each other, wherein an apex angle of the centering point is less than an apex angle between the two main cutting edges.

24. Drill according to claim 23, further comprising rounded transition surfaces provided between the centering point and the chip surfaces and between the centering point and the free surfaces.

25. Drill according to claim 23, wherein the centering point displays rotational symmetry.

26. Drill according to claim 23, wherein the centering point displays plane symmetry with respect to two planes perpendicular to each other, wherein both planes run through a drilling axis and one of the two further constitutes the central plane of the two main cutting edges.

27. Drill according to claim 23, wherein the apex angle of the centering point is in the range of approximately 80° to 130°.

* * * * *